(12) United States Patent
Biondo, Jr. et al.

(10) Patent No.: US 11,061,605 B1
(45) Date of Patent: Jul. 13, 2021

(54) DYNAMICALLY PERFORMING MANAGED FILE TRANSFER BASED ON POLICIES

(71) Applicant: International Business Machines Corporation, Armonk, NY (US)

(72) Inventors: Jose Gilberto Biondo, Jr., Sao Paulo (BR); Juscelino Candido De Lima, Jr., Sao Paulo (BR); Carlos Eduardo Seo, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 16/738,136

(22) Filed: Jan. 9, 2020

(51) Int. Cl.
| G06F 12/00 | (2006.01) |
| G06F 3/06 | (2006.01) |
| G06F 13/00 | (2006.01) |
| G06F 13/28 | (2006.01) |

(52) U.S. Cl.
CPC .......... *G06F 3/0655* (2013.01); *G06F 3/0604* (2013.01); *G06F 3/067* (2013.01)

(58) Field of Classification Search
CPC ....... G06F 3/0655; G06F 3/067; G06F 3/0604
See application file for complete search history.

(56) References Cited

U.S. PATENT DOCUMENTS

| 8,849,761 | B2 | 9/2014 | Prahlad et al. | |
| 8,924,425 | B1* | 12/2014 | Pandey | G06F 16/289 |
| | | | | 707/792 |
| 10,216,580 | B1 | 2/2019 | Peleg et al. | |
| 10,379,914 | B2* | 8/2019 | Zhang | G06F 9/541 |
| 10,430,602 | B2 | 10/2019 | Dain et al. | |
| 2005/0038830 | A1 | 2/2005 | Lee | |
| 2012/0296960 | A1* | 11/2012 | Kreuzer | H04L 67/1097 |
| | | | | 709/203 |

FOREIGN PATENT DOCUMENTS

WO    WO2017009828 A1    1/2017

OTHER PUBLICATIONS

IBM Corporation, "Providing a secure and resilient data repository to speed up the delivery of broadcast content," BASE Media Cloud, accessed Oct. 19, 2019, copyright 2019, 6 pages. https://www.ibm.com/case-studies/base-media-cloud-ibm-aspera.
IBM Corporation, "Object Storage," IBM Cloud Education, May 21, 2019, accessed Oct. 19, 2019, 15 pages. https://www.ibm.com/cloud/learn/object-storage.

\* cited by examiner

*Primary Examiner* — Mark A Giardino, Jr.
(74) *Attorney, Agent, or Firm* — Yee & Associates, P.C.

(57) ABSTRACT

Managing file transfers is provided. In response to receiving a request from a user of a first mainframe to transfer a data file to a second mainframe using a file transfer protocol, the request is intercepted to perform a comparison of the request with data maintained in a file transfer matrix of predetermined criteria that includes a set of policies. In response to determining that a match exists between the request and the data maintained in the file transfer matrix based on the comparison, the request is identified as eligible for an object storage file transfer protocol. An object storage file transfer is initiated by pausing processing of the file transfer protocol. Copy and dump of the data file on a cloud object-based storage system is executed using the object storage file transfer protocol. The request is replaced with a dummy request.

20 Claims, 8 Drawing Sheets

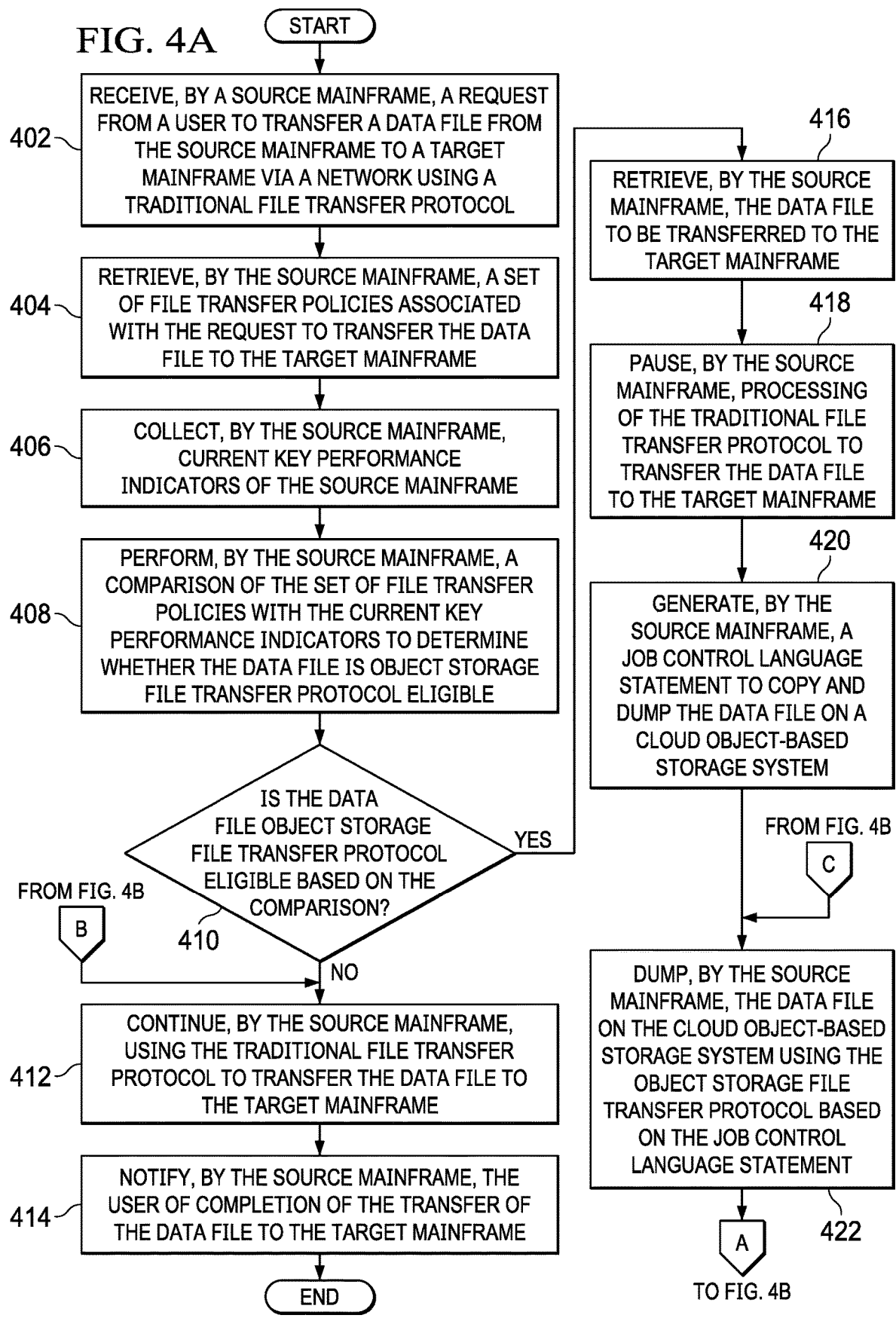

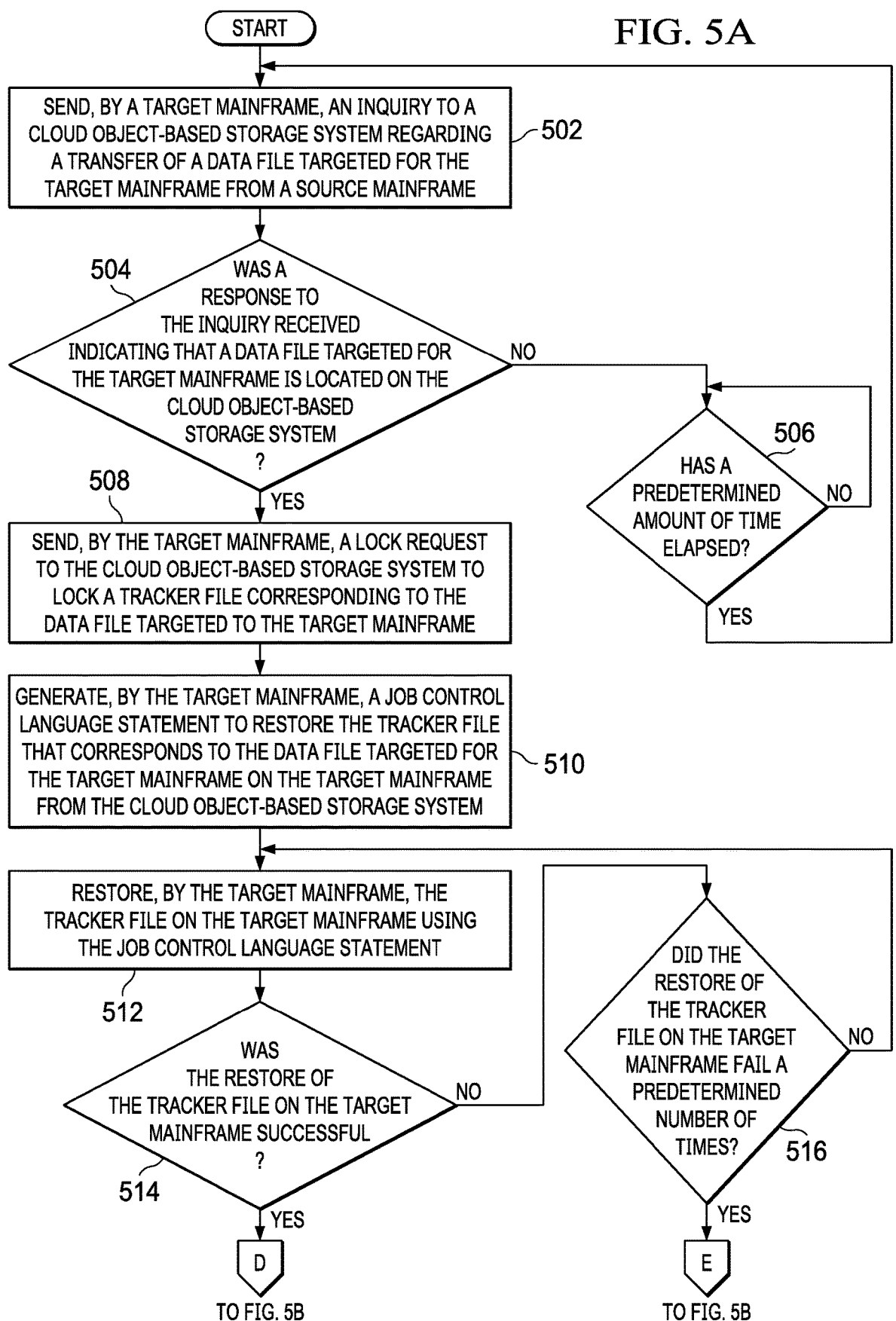

DYNAMICALLY PERFORMING MANAGED FILE TRANSFER BASED ON POLICIES

BACKGROUND

1. Field

The disclosure relates generally to managed file transfers and more specifically to dynamically performing managed file transfer between different mainframe platforms based on a set of one or more policies.

2. Description of the Related Art

Mainframes are computers used primarily by large organizations for mission-critical applications requiring high volumes of data processing, such as, for example, bulk data processing, industry and consumer statistics, enterprise resource planning, and transaction processing. Mainframes are larger and have more processing power than some other classes of computers, such as, for example, servers, workstations, personal computers, and the like. In addition, mainframes are capable of supporting hundreds, or even thousands, of users simultaneously.

Managed file transfer is a reliable and guaranteed delivery file transfer service with all the management, error handling and recovery features built in for a secure and encrypted file transfer. Managed file transfer supports data file transfer across file transfer protocols, such as, for example, File Transfer Protocol, Secure Shell File Transfer Protocol, File Transfer Protocol over Secure Socket Layer, or the like, and various file systems, such as, for example, Windows, Linux/Unix, mid-range systems, object stores, cloud storage, and the like. The file transfer is secure and encrypted and tracked through the transfer and in-transit processing providing a reliable enterprise grade managed file transfer platform for managing the secure transfer of data from a source location to one or more destination locations via public, private, and hybrid network. In other words, managed file transfer manages the life cycle of a data file transfer.

SUMMARY

According to one illustrative embodiment, a computer-implemented method for managing file transfers is provided. In response to receiving a request from a user of a first mainframe to transfer a data file to a second mainframe using a file transfer protocol, the request is intercepted using a file transfer manager to perform a comparison of the request with data maintained in a file transfer matrix of predetermined criteria that includes a set of policies. In response to determining that a match exists between the request and the data maintained in the file transfer matrix of predetermined criteria based on the comparison, the request is identified as eligible for an object storage file transfer protocol. An object storage file transfer is initiated by pausing processing of the file transfer protocol. Copy and dump of the data file on a cloud object-based storage system is executed using the object storage file transfer protocol. The request is replaced with a dummy request. According to other illustrative embodiments, a computer system and computer program product for managing file transfers are provided.

BRIEF DESCRIPTION OF THE DRAWINGS

FIGS. 4A-4B are a flowchart illustrating a process for a source mainframe platform in accordance with an illustrative embodiment;

FIGS. 5A-5B are a flowchart illustrating a process for a target mainframe platform in accordance with an illustrative embodiment.

DETAILED DESCRIPTION

Figure 1:
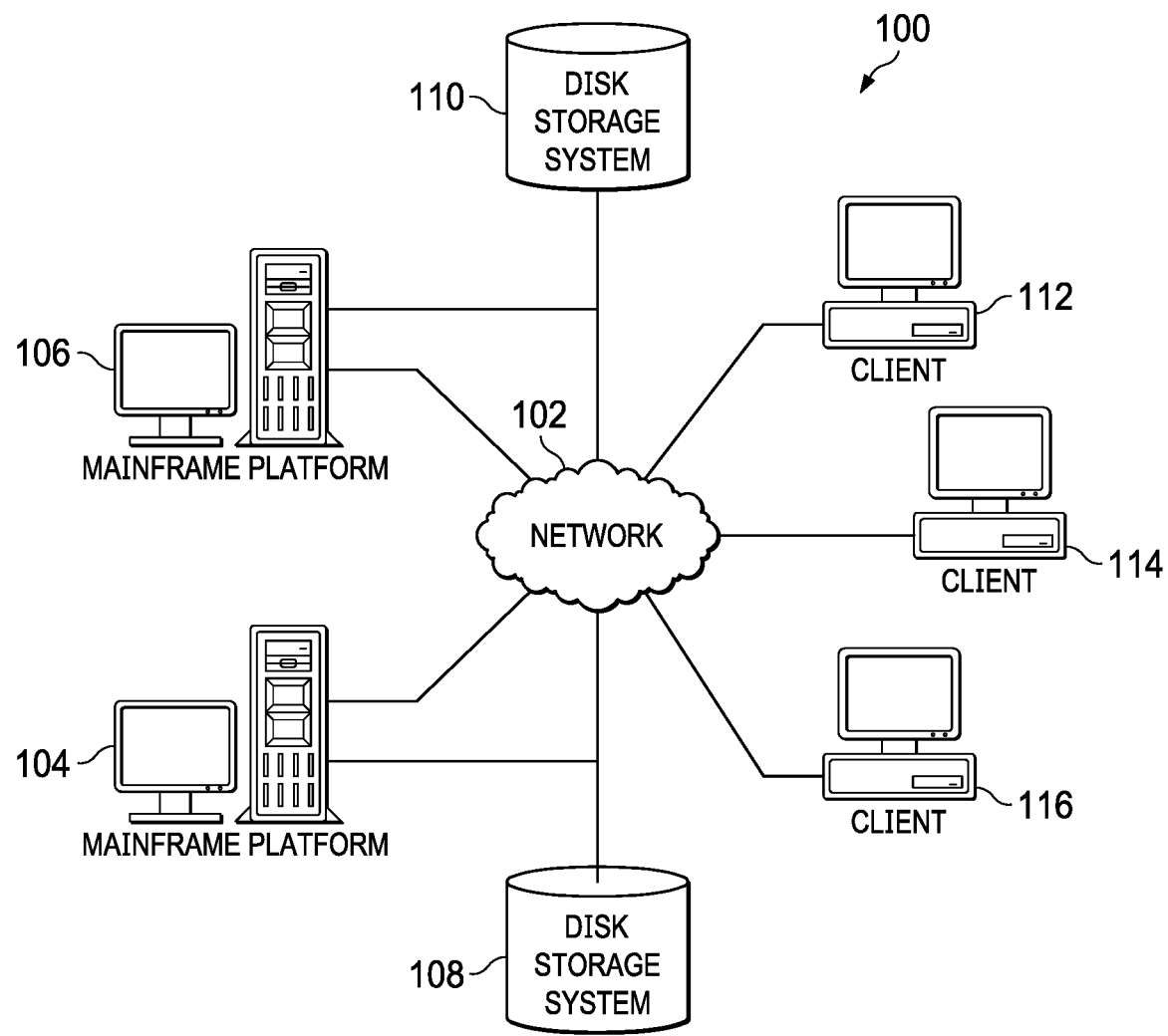
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
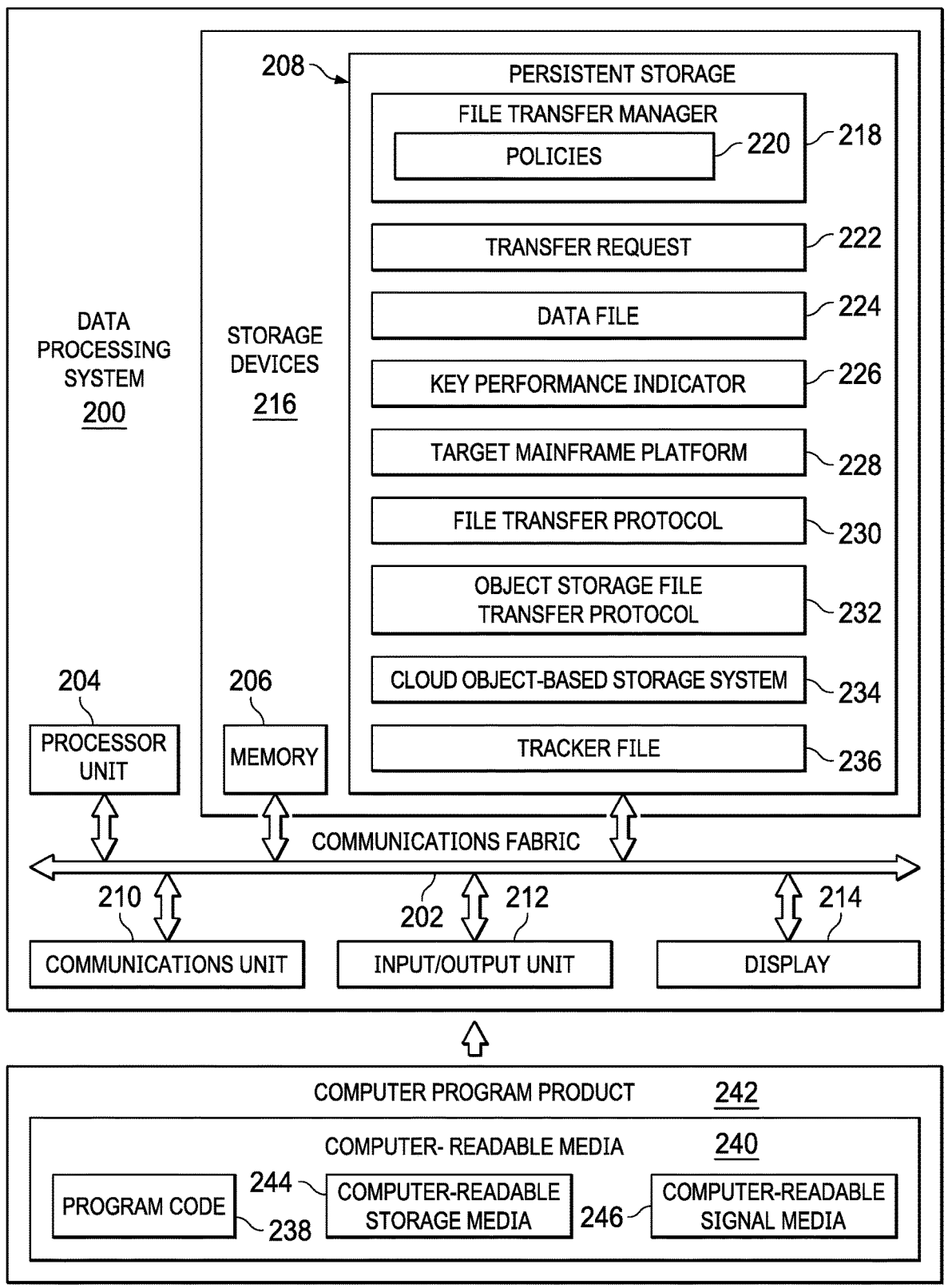
FIG. 2 is a diagram of a data processing system in which illustrative embodiments may be implemented.
Figure 3:
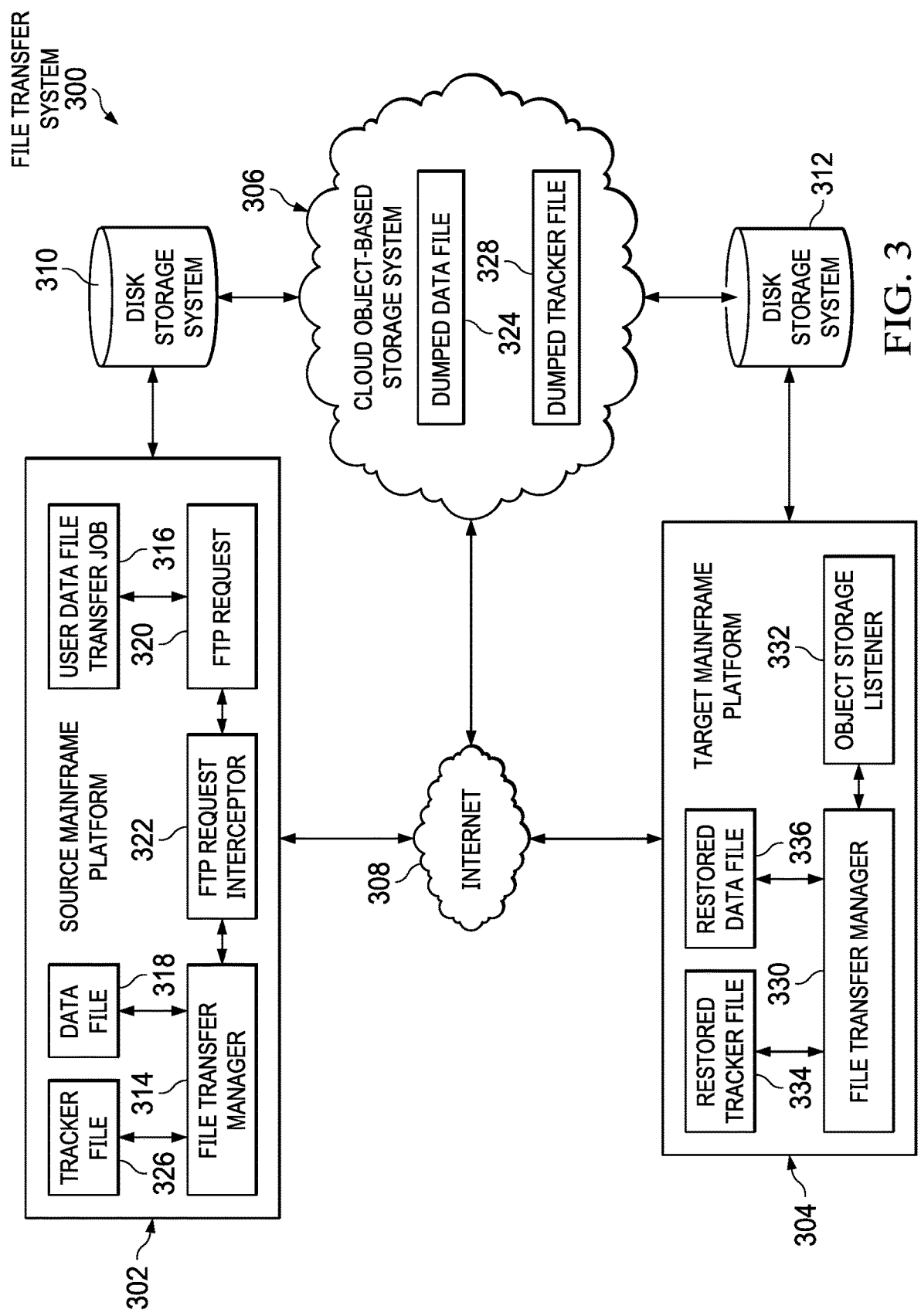
FIG. 3 is a diagram illustrating an example of a file transfer system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, mainframe platform 104 and mainframe platform 106 connect to network 102, along with disk storage system 108 and disk storage system 110. Mainframe platform 104 and mainframe platform 106 may be, for example, mainframe computers with high-speed connections to network 102. In addition, mainframe platform 104 and mainframe platform 106 may provide one or more services, such as, for example, data analytics services, transaction processing services, and the like. Also, it should be noted that illustrative embodiments may transfer data files from one mainframe platform to another based on a set of one or more policies, such as, for example, file transfer policies, source mainframe platform policies, network policies, target mainframe platform policies, or any combination thereof, defined by a system administrator. For example, mainframe platform 104 may be a source mainframe platform and mainframe platform 106 may be a target mainframe platform for transfer of a set of one or more data files for processing, archiving, editing, backup, and the like. Illustrative embodiments may combine one or more policies that can act together to determine the file transfer method. In addition, illustrative embodimentsd may utilize an object storage file transfer protocol to send files to a first target mainfram platform, but utilize a regular file transfer protocol when sending files to a second target mainframe platform.

Further, it should be noted that mainframe platform 104 and mainframe platform 106 may each represent a cluster of mainframes in one or more data centers. Alternatively, mainframe platform 104 and mainframe platform 106 may each represent multiple computing nodes in one or more cloud environments.

Client 112, client 114, and client 116 also connect to network 102. Clients 112, 114, and 116 are clients of mainframe platform 104 and mainframe platform 106. In this example, clients 112, 114, and 116 are shown as desktop or personal computers with wire communication links to network 102. However, it should be noted that clients 112, 114, and 116 are examples only and may represent other types of data processing systems, such as, for example, network computers, laptop computers, handheld computers, smart phones, smart watches, smart televisions, and the like, with wire or wireless communication links to network 102. Users of clients 112, 114, and 116 may utilize clients 112, 114, and 116 to access and utilize the services provided by mainframe platform 104 and mainframe platform 106.

Disk storage system 108 and disk storage system 110 correspond to mainframe platform 104 and mainframe platform 106, respectively. Disk storage system 108 and disk storage system 110 represent data storage that comprise multiple storage devices capable of storing any type of data in a structured format or an unstructured format. In addition, disk storage system 108 and disk storage system 110 may each represent a plurality of data storage systems. Further, disk storage system 108 and disk storage system 110 may store identifiers and network addresses for a plurality of different mainframe platforms, identifiers and network addresses for a plurality of different client devices, identifiers for a plurality of different users, and the like. Furthermore, disk storage system 108 and disk storage system 110 may store other types of data, such as authentication or credential data that may include user names, passwords, and biometric data associated with system administrators and users, for example.

In addition, it should be noted that network data processing system 100 may include any number of additional mainframe platforms, clients, disk storage systems, and other devices not shown. Program code located in network data processing system 100 may be stored on a computer readable storage medium and downloaded to a computer or other data processing device for use. For example, program code may be stored on a computer readable storage medium on mainframe platform 104 and downloaded to client 112 over network 102 for use on client 112.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as mainframe platform 104 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

File transfer manager 218 controls the process of dynamically performing managed file transfer between data processing system 200 and other mainframe platforms based on policies 220. Policies 220 represent a set of one or more different policies, such as, for example, file transfer policies, source system policies, network policies, target system policies, or any combination thereof, defined by a system administrator and may be based on key performance indicators, such as, for example, available processor cycles of processor unit 204, available space in memory 206, network bandwidth available to communications unit 210, and the like. In other words, policies 220 may include, for example, threshold levels for maximum processor cycle usage, maximum memory usage, minimum network bandwidth availability, and the like.

Transfer request 222 represents a request from a user of data processing system 200 to transfer data file 224 to a different mainframe platform. Data file 224 may contain any type of data and include any number of datasets. In this example, transfer request 222 is a request to transfer data file 224 to the other mainframe platform via a traditional file transfer protocol.

Key performance indicators 226 represent current key performance indicators corresponding to data processing system 200. Key performance indicators 226 may include, for example, processor, memory, and network key performance indicators. File transfer manager 218 compares key performance indicators 226 to policies 220 to determine whether key performance indicators 226 comply with policies 220. By determining whether key performance indicators 226 comply with policies 220, file transfer manager 218 is able to select an appropriate protocol for transferring data file 224. Target mainframe platform 228 represents an identifier of a target mainframe platform, such as, for example, mainframe platform 106 in FIG. 1, for data file 224.

If file transfer manager 218 determines that key performance indicators 226 do not comply with policies 220, then file transfer manager 218 selects file transfer protocol 230 to transfer data file 224 to target mainframe platform 228. File transfer protocol 230 represents the traditional file transfer protocol. Afterward, file transfer manager 218 transfers data file 224 to target mainframe platform 228 using file transfer protocol 230.

If file transfer manager 218 determines that key performance indicators 226 comply with policies 220, then file transfer manager 218 selects object storage file transfer protocol 232 to transfer data file 224 to cloud object-based storage system 234. Cloud object-based storage system 234 represents an identifier of a cloud object-based storage system coupled to data processing system 200 via a network, such as, for example, network 102 in FIG. 1.

Cloud object-based storage system 234 is object storage in a cloud environment, such as, for example, a public cloud, private cloud, hybrid cloud, or the like. Object storage is a computer data storage architecture that manages data as objects, as opposed to other storage architectures, such as file systems, which manage data as a file hierarchy. Each object typically includes the data, itself, a variable amount of corresponding metadata, and a globally unique identifier. Object storage enables capabilities not addressed by other storage architectures, such as, for example, interfaces that can be directly programmable by an application, a namespace that can span multiple instances of physical hardware, and data-management functions such as data replication and data distribution at object-level granularity.

If file transfer manager 218 selects object storage file transfer protocol 232 to transfer data file 224 to cloud object-based storage system 234 based on determining that key performance indicators 226 comply with policies 220, then file transfer manager 218 transfers data file 224 to cloud object-based storage system 234 using object storage file transfer protocol 232. In addition, file transfer manager 218 generates tracker file 236 in response to transferring data file 224 to cloud object-based storage system 234. Tracker file 236 corresponds to data file 224 and includes information, such as, for example, identifier of data file 224, size of data file 224, number of datasets in data file 224, identifier of data processing system 200, identifier of target mainframe platform 228, time of transfer to cloud object-based storage system 234, and the like.

Target mainframe platform 228 may ping cloud object-based storage system 234 on a periodic basis to determine whether a data file, such as data file 224, which is targeted for target mainframe platform 228 from data processing system 200, is stored on cloud object-based storage system 234. Alternatively, cloud object-based storage system 234 may send a notification to target mainframe platform 228 indicating that data file 224 targeted for target mainframe platform 228 is stored on cloud object-based storage system 234. If cloud object-based storage system 234 indicates that data file 224, which is targeted for target mainframe platform 228, is stored on cloud object-based storage system 234, then target mainframe platform 228 executes a recovery job to restore tracker file 236 on target mainframe platform 228 from cloud object-based storage system 234. It should be noted that "job" is an example only. In other words, illustrative embodiments may utilize other ways, such as user exits, to restore tracker file 236 on target mainframe platform 228. After restoring tracker file 236 on target mainframe platform 228, target mainframe platform 228 utilizes the information in tracker file 236 to restore data file 224 on target mainframe platform 228.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200. In some instances, computer readable storage media 244 may not be removable from data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 238 may be downloaded over a network to persistent storage 208 from another device or data processing system through computer readable signal media 246 for use within data processing system 200. For instance, program code stored in a computer readable storage media in a data processing system may be downloaded over a network from the data processing system to data processing system 200. The data processing system providing program code 238 may be a server computer, a client computer, or some other device capable of storing and transmitting program code 238.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 244 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Over the past few decades, mainframes were known for data processing on data centers, with data communication and sharing between mainframe systems being a critical point, as sharing data between mainframe systems that do not share other resources (i.e., mainframes that are part of the same system complex), can lead to data overlap and result in inconsistent data. A system complex is a cluster of mainframes acting together as a single system for high performance and high availability.

In order to transfer data between different mainframe systems, file transfer solutions have been used, such as, for example, File Transfer Protocol and Direct Connect. File Transfer Protocol (FTP) is a standard network protocol used for the transfer of data files between computers on a computer network. For secure transmission that protects and encrypts the content, FTP is secured with Secure Socket Layer/Transport Layer Security (FTPS) or replaced with Secure Shell File Transfer Protocol (SFTP). Direct Connect is a peer-to-peer file sharing protocol.

Specifically, a user submits a job "or unit of work" with FTP information to trigger the transfer of data files between mainframe platforms. While these existing file transfer solutions above allow for the transfer of data files between mainframe platforms, these existing file transfer solutions consume vital mainframe resources, such as processor, memory, and network resources. In some mainframe systems, with high integration between mainframes, file transfer programs are listed among the highest consumers of processor resources.

Illustrative embodiments provide a new data file transfer mechanism across mainframe platforms by utilizing a cloud object-based storage system driven by file transfer policies. Illustrative embodiments reduce processor, memory, and network workload on the mainframe platforms involved in a data file transfer by using a file transfer mechanism that is common to and recognized by both mainframe platforms (i.e., the cloud object-based storage system). Moreover, illustrative embodiments dynamically decide which file transfer mechanism illustrative embodiments will use, disregarding an existing managed file transfer solution, by utilizing a set of predefined file transfer policies and obtained key performance indicators (KPIs) corresponding to the source mainframe platform.

Illustrative embodiments allow the data file transfer between different mainframe platforms that do not share resources, without resulting in high mainframe processor overhead. Illustrative embodiments utilize the set of predefined file transfer policies as metadata to control the data file transfer process. If illustrative embodiments determine that a data file transfer request complies with the set of predefined file transfer policies, then illustrative embodiments initiate the file transfer to the cloud object-based storage system.

Illustrative embodiments may or may not utilize an existing managed file transfer infrastructure. Illustrative embodiments utilize a file transfer manager that is responsible for obtaining KPIs, such as processor, memory, and network utilization metrics, from the source mainframe platform and comparing the KPIs with the predefined file transfer policies defined by a system administrator. Based on the comparison, illustrative embodiments dynamically perform the mainframe data file transfer via a traditional FTP method or via the cloud object-based storage method of illustrative embodiments.

Illustrative embodiments transfer the data file between the different mainframe platforms utilizing the cloud object-based storage as a common point of access to both mainframe platforms. Illustrative embodiments provide the means to send, parse, translate, and receive data files between the two different mainframe platforms.

A source mainframe platform (e.g., first mainframe computer system) runs a file transfer manager, which is responsible for intercepting file transfer requests to other mainframe platforms. Whenever the source mainframe platform receives a job or "unit of work" corresponding to an FTP request that complies with the set of file transfer policies, the file transfer manager intercepts the FTP request and activates data file transfer processing. The file transfer manager includes the set of file transfer policies, which determines whether a data file is automatically transferred to the cloud object-based storage system or not. It should be noted that the system administrator may dynamically change the set of file transfer policies based on obtained KPIs from the source mainframe platform. For example, if the network traffic in the source mainframe platform is below a network traffic threshold set by a particular file transfer policy, then file transfer manager transfers the data file from the source mainframe platform to the target mainframe platform using the traditional FTP method. Similarly, if the file transfer manager determines that processor and network utilization levels associated with the source mainframe platform are above processor and network utilization thresholds set by file transfer policies, then the file transfer manager transfers the data file to the cloud object-based storage system prior to the transferring of the data file to the target mainframe platform.

The file transfer manager receives the data file being transferred and invokes a copy and dump program to execute instructions to copy and dump the data file on the cloud object-based storage system. The file transfer manager may utilize, for example, a job control language statement or some other means to invoke the copy and dump program. Job control language is a scripting language used on mainframe operating systems to instruct a mainframe on how to run a batch job or start a subsystem. More specifically, the job control language indicates which programs to run, using which files or devices for input or output. The file transfer manager invokes the copy and dump program with the same authority as the invoking user, ensuring that only users with access to the data file will be able to perform the data file transfer.

The file transfer manager relies on existing cloud communication capabilities to perform the data file dump on the cloud object-based storage system. Once the file transfer manager transfers the data file to the cloud object-based storage system, the cloud object-based storage system notifies the file transfer manager regarding transfer completion. If file transfer job processing failed, the file transfer manager retries the file transfer job up to a predetermined number of times, such as, for example, three times. If all file transfer job retries failed, then the file transfer manager fails the file transfer to the cloud object-based storage system and utilizes the traditional FTP to transfer the data file to the target mainframe platform.

Because the source mainframe platform is only responsible for sending commands to the disk storage system to perform the file transfer, the source mainframe platform generates only a minimal amount of resource overhead. All copy activities are performed by the disk storage system and are transparent to the source mainframe platform.

After the data file transfer job completes successfully, the file transfer manager intercepts the data file transfer job return code and generates a tracker file corresponding to the data file transfer. The tracker file includes information, such as, for example, number of datasets copied and transferred with the data file, data file name, object storage names, and the like. Further, the file transfer manager generates another JCL statement to invoke the copy and dump program to execute instructions to copy and dump the tracker file on the cloud object-based storage system. Illustrative embodiments use the tracker file as a control of the file transfer to the target mainframe platform. The file transfer manager submits the tracker file dump job under the authority of the cloud object-based storage system process and the file transfer manager monitors the tracker file dump job to completion. If tracker file dump job processing failed, the file transfer manager retries the tracker file dump job up to a predetermined number of time (e.g., three times). If all tracker file dump job retries failed, then the file transfer manager fails the tracker file dump to the cloud object-based storage system and utilizes the traditional FTP.

If the tracker file dump job processing is successful, then the file transfer manager replaces the original FTP request with a dummy request so that an FTP error message will not be sent to the user. This allows the traditional FTP processing to continue with the dummy request, allowing a successful file transfer return code to be sent to the user.

The target mainframe platform (e.g., second mainframe computer system) has a similar structure as the source mainframe platform (e.g., first mainframe computer system). For example, the target mainframe platform also comprises a file transfer manager, a copy and dump program, network (e.g., Ethernet) access, and a disk storage system with cloud object-based storage system connectivity.

The file transfer manager of the target mainframe platform utilizes an object storage listener to listen to the cloud object-based storage system for data files to be transferred from the source mainframe platform. The object storage listener periodically sends an inquiry to the cloud object-based storage system. If a response is not received corresponding to the inquiry, then object storage listener waits for a specified amount of time prior to submitting a new inquiry. When the source mainframe platform dumps the tracker file on the cloud object-based storage system, the target mainframe platform receives a response to the inquiry from the cloud object-based storage system identifying the tracker file. The target mainframe platform being the target for the tracker file starts a tracker file restore job and requests that the cloud object-based storage system place a lock on the tracker file.

The target mainframe platform generates a job control language statement to restore the tracker file. The file transfer manager waits and evaluates the return code of the tracker file restore job to determine whether the tracker file restore job was successful or not. If tracker file restore job processing failed, then the file transfer manager retries the tracker file restore job up to a predetermined number of times (e.g., three times). If all tracker file restore job retries failed, then the file transfer manager fails the tracker file restore job, releases the lock on the tracker file, logs an error message on the target mainframe platform, and stops processing. If tracker file restore job processing is successful, then the file transfer manager utilizes the information contained in the tracker file to send commands via an API of the cloud object-based storage system to lock corresponding object data to ensure data integrity. The recovered tracker file contains all pertinent information, such as, for example, number of datasets in the data file, data file identifier, object storage identifiers, and the like, which is related to the dumped data files on the cloud object-based storage system from the source mainframe platform.

If the lock is successful, then the file transfer manager generates a job control language statement for performing a data file restore job. The file transfer manager evaluates the data file restore job return code to determine whether the data file restore job was successful or not. If data file restore job processing failed, then the file transfer manager retries the data file restore job up to a predetermined number of time (e.g., three times). If all data file restore job retries failed, then the file transfer manager fails the data file restore job, logs an error message on the target mainframe platform, and stops processing. If data file restore job processing is successful, then the file transfer manager sends a command via the API of the cloud object-based storage system to remove the lock on the corresponding object data. Furthermore, the file transfer manager issues another command to delete the corresponding object data from the cloud object-based storage system.

Therefore, illustrative embodiments provide a mainframe policy-driven data file transfer mechanism. In addition, illustrative embodiments provide automatic transfer of data files across different mainframes using a cloud object-based storage system. Further, illustrative embodiments provide transfer of data files between the different mainframes with minimal processor, memory, and network overhead, which in turn reduces total cost of ownership.

Thus, illustrative embodiments provide one or more technical solutions that overcome a technical problem with transferring data files between different mainframe platforms. As a result, these one or more technical solutions provide a technical effect and practical application in the field of managed file transfer.

With reference now to FIG. 3, a diagram illustrating an example of a file transfer system is depicted in accordance with an illustrative embodiment. File transfer system 300 may be implemented in a network of data processing systems, such as network data processing system 100 in FIG. 1. File transfer system 300 is a system of hardware and software components for dynamically performing managed file transfer between different mainframe platforms based on file transfer policies.

In this example, file transfer system 300 includes source mainframe platform 302, target mainframe platform 304, cloud object-based storage system 306, internet 308, disk storage system 310, and disk storage system 312. Internet 308 may be, for example, network 102 in FIG. 1. Disk storage system 310 and disk storage system 312 correspond to source mainframe platform 302 and target mainframe platform 304, respectively. Source mainframe platform 302 and disk storage system 310 may be, for example, mainframe platform 104 and disk storage system 108 in FIG. 1. Target mainframe platform 304 and disk storage system 312 may be, for example, mainframe platform 106 and disk storage system 110 in FIG. 1. In addition, source mainframe platform 302 and target mainframe platform 304 include file transfer manager 314 and file transfer manager 330, respectively, such as, for example, file transfer manager 218 in FIG. 2.

At 316, a user submits a job to be executed on source mainframe platform 302. One of the steps in the job consists of transferring data file 318 to another mainframe platform (i.e., target mainframe platform 304) using a traditional FTP service via FTP request 320. The job calls the traditional FTP service to transfer data file 318.

FTP request interceptor 322 intercepts FTP request 320. FTP request interceptor 322 compares FTP request 320 against a table of file transfer policies maintained by file transfer manager 314. If FTP request 320 does not comply with the file transfer policies based on results of the comparison, then FTP request interceptor 322 passes control to traditional FTP processing to process FTP request 320. If FTP request 320 complies with the file transfer policies based on results of the comparison, then FTP request 320 is eligible for object storage file transfer protocol processing.

FTP request interceptor 322 then passes control to file transfer manager 314. File transfer manager 314 then pauses the traditional FTP processing until the object storage transfer completes. In addition, FTP request interceptor 322 passes the file transfer information, such as, for example, data file identifier, job requester identifier, target identifier, data file size, and the like, to file transfer manager 314 using, for example, a JavaScript Object Notation (JSON) format. Optionally, the user can submit the file transfer information directly to file transfer manager 314 using the JSON format.

File transfer manager 314 receives the file transfer information from FTP request interceptor 322 or from the user, processes the file transfer information, and generates the appropriate job control language statement to copy and dump data file 318 on cloud object-based storage system 306. File transfer manager 314 sends the copy and dump instructions to disk storage system 310. Disk storage system 310 receives the copy and dump instructions and then dumps data file 318 on cloud object-based storage system 306 as instructed to form dumped data file 324. Cloud object-based storage system 306 sends return code to disk storage system 310 regarding the transfer of dumped data file 324. Disk storage system 310 then sends the return code corresponding to dumped data file 324 to file transfer manager 314.

File transfer manager 314 evaluates the received return code to determine whether the dump of data file 318 on cloud object-based storage system 306 was successful or not. If the return code indicates that the dump of data file 318 on cloud object-based storage system 306 failed, then file transfer manager 314 passes control to the traditional FTP processing for transferring data file 318 to target mainframe platform 304. If the return code indicates that the dump of data file 318 on cloud object-based storage system 306 was successful to form dumped data file 324, then file transfer manager 314 continues the with object storage file transfer protocol processing by generating tracker file 326, which is used by target mainframe platform 304. Tracker file 326 corresponds to data file 318 and includes information, such as, for example, data file identifier (e.g., data file name), data file size, job requester identifier, source mainframe platform identifier, target mainframe platform identifier, time of processing, and the like.

File transfer manager 314 submits another job to the copy and dump program to copy and dump tracker file 326 on cloud object-based storage system 306. The copy and dump program submits the appropriate instructions to disk storage system 310. Disk storage system 310 receives the copy and dump instructions and then dumps tracker file 326 on cloud object-based storage system 306 as instructed to form dumped tracker file 328. In addition, cloud object-based storage system 306 locks dumped tracker file 328 to prevent modification or deletion of dumped tracker file 328. Cloud object-based storage system 306 sends return code regarding the result of the dump and lock of tracker file 326 on cloud object-based storage system 306 to disk storage system 310. Disk storage system 310 sends the return code regarding the result of the dump of tracker file 326 to file transfer manager 314.

File transfer manager 314 evaluates the received return code to determine whether the dump and lock of tracker file 326 on cloud object-based storage system 306 was successful or not. If the return code indicates that the dump and lock of tracker file 326 on cloud object-based storage system 306 was successful, then file transfer manager 314 replaces FTP request 320 with a dummy request so that the traditional FTP processing can continue without generating an error message. If the return code indicates that the dump and lock of tracker file 326 on cloud object-based storage system 306 failed, then file transfer manager 314 passes control to the traditional FTP processing for transferring data file 318 to target mainframe platform 304. Furthermore, file transfer manager 314 releases the lock on tracker file 326 and deletes tracker file 326 from cloud object-based storage system 306.

File transfer manager 330 running on target mainframe platform 304 has access to Internet 308, similar to file transfer manager 314. Target mainframe platform 304 runs object storage listener 332, which periodically listens for an API call having JSON data that file transfer manager 330 uses to transfer dumped tracker file 328 onto target mainframe platform 304. Alternatively, cloud object-based storage system 306 may run an "inquirer" that periodically checks for dumped tracker files targeted to target mainframe platforms.

If file transfer manager 330 does not receive a response to the inquiry, then file transfer manager 330 ends inquiry processing. File transfer manager 330 restarts the inquiry processing after expiration of a predetermined amount of time.

If file transfer manager 330 receives information in a response from cloud object-based storage system 306 indicating that a data file targeted for target mainframe platform 304 (i.e., dumped tracker file 328) is located on cloud object-based storage system 306, either via the inquiry or object storage listener 332, then file transfer manager 330 parses the information and generates a restore command to receive dumped tracker file 328. It should be noted that file transfer manager 330 requests that dumped tracker file 328 be locked on cloud object-based storage system 306 to prevent updates or deletion while processing. The resulting restore job is submitted under the authority of file transfer manager 330.

After the restore job corresponding to dumped tracker file 328 completes, file transfer manager 330 receives the tracker file restore job return code. If the tracker file restore job return code indicates that the restore of dumped tracker file 328 failed, then file transfer manager 330 retries the tracker file restore job processing up to a predetermined number of times (e.g., three times). If all retries failed, then file transfer manager 330 terminates the tracker file restore job processing, releases the lock on the tracker file, and issues an error message to the log of target mainframe platform 304 to notify the user that the tracker file restore job failed.

If the tracker file restore job return code indicates that the restore of dumped tracker file 328 on target mainframe platform 304 was successful to form restored tracker file 334, then file transfer manager 330 uses information, such as data file identifier, source mainframe platform identifier, target mainframe platform identifier, object storage identifier, job requester identifier, data file size, and the like, contained in restored tracker file 334 to identify the object storage file corresponding to dumped data file 324 on cloud object-based storage system 306 targeted for target mainframe platform 304. Then, file transfer manger 330 requests that cloud object-based storage system 306 place a lock on the object storage file corresponding to dumped data file 324 to ensure data integrity.

Cloud object-based storage system 306 sends a response to the lock request to file transfer manager 330. If the response indicates that the lock was successful, then file transfer manager 330 generates a restore job corresponding to dumped data file 324 to receive the object storage file from cloud object-based storage system 306. The data file restore job return code is sent to file transfer manager 330. File transfer manager 330 evaluates the data file restore job return code to determine whether the restore job processing was successful or not. If the data file restore job return code indicates that that the data file restore job failed, then file transfer manager 330 retries the data file restore processing up to a predetermined number of times (e.g., three times). If all data file restore processing retries failed, then file transfer manager 330 releases the lock on dumped data file 324 and issues an error message on the log of target mainframe platform 304 to notify the user of the data file restore job failure. If the data file restore job return code indicates that the data file restore job on target mainframe platform 304 was successful to form restored data file 336, then file transfer manger 330 sends a request to cloud object-based storage system 306 to release the lock against the object storage file corresponding to dumped data file 324.

Cloud object-based storage system 306 returns the result of the lock release to file transfer manager 330. File transfer manager 330 evaluates the result of the lock release. If the lock release failed, then file transfer manager 330 retries the lock release request up to a predetermined number of times (e.g., three times). If all lock release retries failed, then file transfer manager 330 sends an error message to the log of target mainframe platform 304 to notify the user of the lock release failure. Further, file transfer manager 330 requests deletion of the object storage file corresponding to dumped data file 324 stored on cloud object-based storage system 306.

Cloud object-based storage system 306 returns the result of the object storage file deletion to file transfer manager 330. File transfer manager 330 evaluates the result of the object storage file deletion. If the object storage file deletion failed, then file transfer manager 330 retries the object storage file deletion request up to a predetermined number of times (e.g., three time). If all object storage file deletion retries failed, then file transfer manager 330 sends an error message to the log of target mainframe platform 304 to notify the user of the object storage file deletion failure.

Figure 4B:
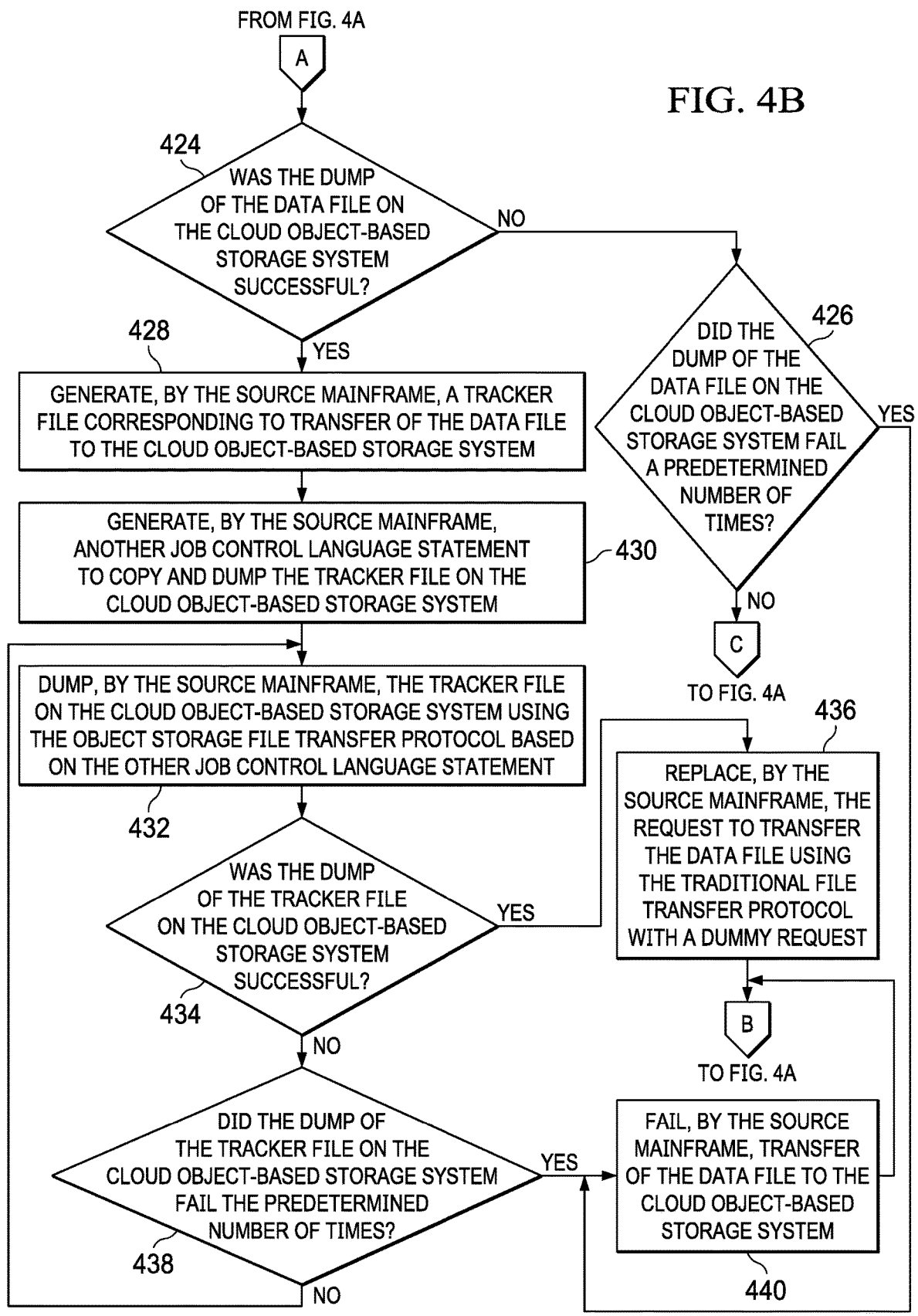

With reference now to FIGS. 4A-4B, a flowchart illustrating a process for a source mainframe platform is shown in accordance with an illustrative embodiment. The process shown in FIGS. 4A-4B may be implemented in a source mainframe platform, such as, for example, mainframe platform 104 in FIG. 1 or data processing system 200 in FIG. 2.

The process begins when the source mainframe platform receives a request from a user to transfer a data file from the source mainframe platform to a target mainframe platform via a network using a traditional file transfer protocol (step 402). The source mainframe platform retrieves a set of file transfer policies associated with the request to transfer the data file to the target mainframe platform (step 404). In addition, the source mainframe platform collects current key performance indicators, such as, for example, processor utilization, available memory, network utilization, and the like, of the source mainframe platform (step 406).

The source mainframe platform performs a comparison of the set of file transfer policies with the current key performance indicators to determine whether the data file is object storage file transfer protocol eligible (step 408). Afterward, the source mainframe platform makes a determination as to whether the data file is object storage file transfer protocol eligible based on the comparison (step 410). If the source mainframe platform determines that the data file is not object storage file transfer protocol eligible based on the comparison, "NO" output of step 410, then the source mainframe platform continues using the traditional file transfer protocol to transfer the data file to the target mainframe (step 412). Subsequently, the source mainframe platform notifies the user of completion of the transfer of the data file to the target mainframe (step 414). Thereafter, the process terminates.

Returning again to step 410, if the source mainframe platform determines that the data file is object storage file transfer protocol eligible based on the comparison, "YES" output of step 410, then the source mainframe platform retrieves the data file to be transferred to the target mainframe (step 416). Further, the source mainframe platform pauses processing of the traditional file transfer protocol to transfer the data file to the target mainframe (step 418). Furthermore, the source mainframe platform generates a job control language statement to copy and dump the data file on a cloud object-based storage system (step 420).

The source mainframe platform attempts to dump the data file on the cloud object-based storage system using the object storage file transfer protocol based on the job control language statement (step 422). The source mainframe platform makes a determination as to whether the dump of the data file on the cloud object-based storage system was successful (step 424). If the source mainframe platform determines that the dump of the data file on the cloud object-based storage system was not successful, NO output of step 424, then the source mainframe platform makes a determination as to whether the dump of the data file on the cloud object-based storage system failed a predetermined number of times, such as, for example, three times (step 426). If the source mainframe platform determines that the dump of the data file on the cloud object-based storage system did not fail the predetermined number of times, NO output of step 426, then the process returns to step 422 where the source mainframe platform continues to try to dump the data file on the cloud object-based storage system. If the source mainframe platform determines that the dump of the data file on the cloud object-based storage system did fail the predetermined number of times, YES output of step 426, then the process proceeds to step 440.

Returning again to step 424, if the source mainframe platform determines that the dump of the data file on the cloud object-based storage system was successful, YES output of step 424, then the source mainframe platform generates a tracker file corresponding to transfer of the data file to the cloud object-based storage system (step 428). The source mainframe platform also generates another job control language statement to copy and dump the tracker file on the cloud object-based storage system (step 430). Afterward, the source mainframe platform attempts to dump the tracker file on the cloud object-based storage system using the object storage file transfer protocol based on the other job control language statement (step 432).

The source mainframe platform makes a determination as to whether the dump of the tracker file on the cloud object-based storage system was successful (step 434). If the source mainframe platform determines that the dump of the tracker file on the cloud object-based storage system was successful, YES output of step 434, then the source mainframe platform replaces the request to transfer the data file using the traditional file transfer protocol with a dummy request (step 436). Thereafter, the process returns to step 412 where the source mainframe platform continues with the traditional file transfer protocol using the dummy request. If the source mainframe platform determines that the dump of the tracker file on the cloud object-based storage system was not successful, NO output of step 434, then the source mainframe platform makes a determination as to whether the dump of the tracker file on the cloud object-based storage system failed the predetermined number of times (step 438).

If the source mainframe platform determines that the dump of the tracker file on the cloud object-based storage system did not fail the predetermined number of times, NO output of step 438, then the process returns to step 432 where the source mainframe platform continues to try to dump the tracker file on the cloud object-based storage system. If the source mainframe platform determines that the dump of the tracker file on the cloud object-based storage system did fail the predetermined number of times, YES output of step 438, then the source mainframe platform fails transfer of the data file to the cloud object-based storage system (step 440). Thereafter, the process returns to step 412 where the source mainframe platform continues using the traditional file transfer protocol to transfer the data file to the target mainframe platform.

Figure 5B:
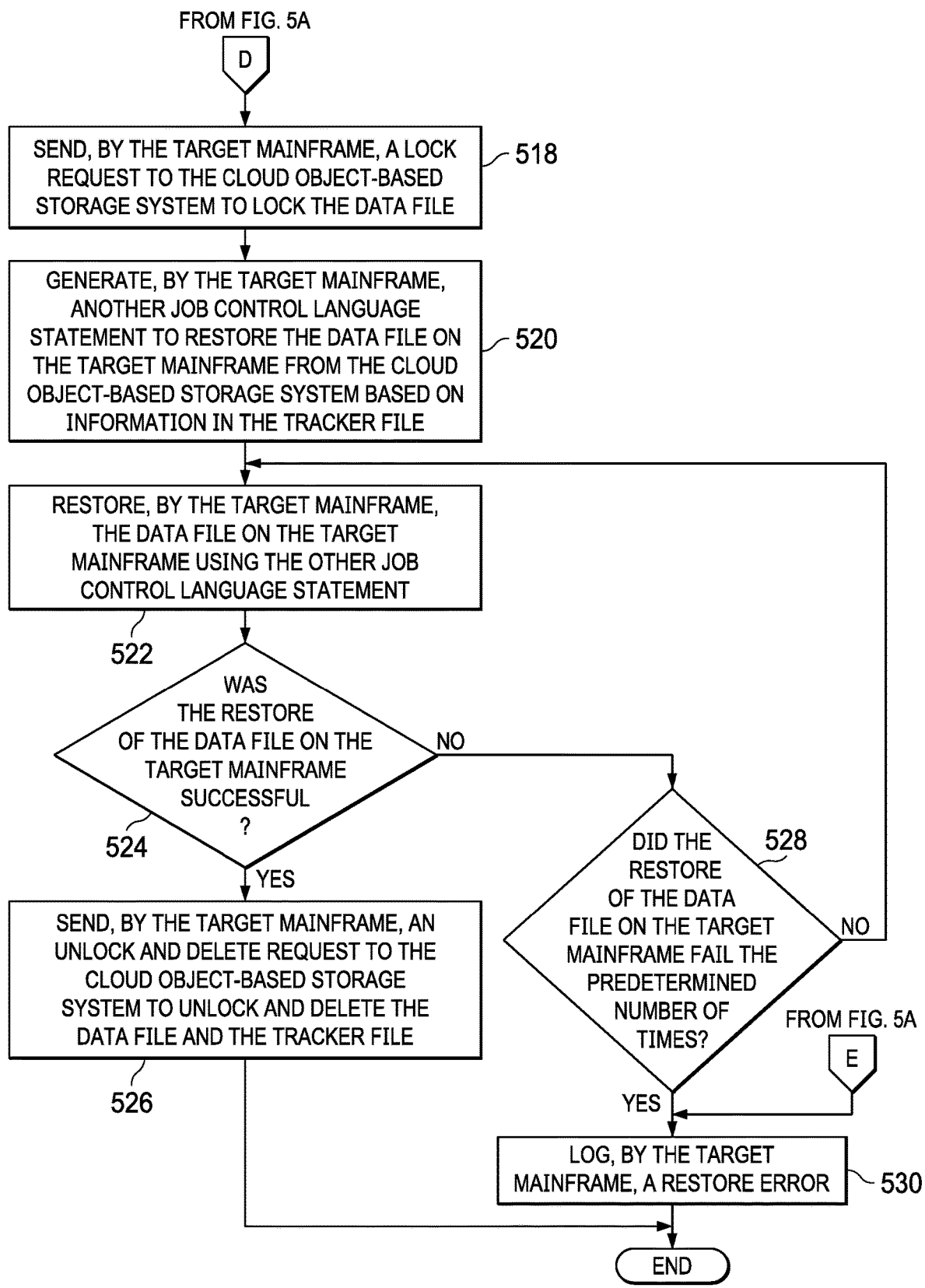

With reference now to FIGS. 5A-5B, a flowchart illustrating a process for a target mainframe platform is shown in accordance with an illustrative embodiment. The process shown in FIGS. 5A-5B may be implemented in a target mainframe platform, such as, for example, mainframe platform 106 in FIG. 1 or target mainframe platform 304 in FIG. 3.

The process begins when the target mainframe platform sends an inquiry to a cloud object-based storage system regarding a transfer of a data file targeted for the target mainframe platform from a source mainframe platform (step 502). The target mainframe platform makes a determination as to whether a response to the inquiry was received indicating that a data file targeted for the target mainframe is located on the cloud object-based storage system (step 504). If the target mainframe platform determines that a response to the inquiry was not received indicating that a data file targeted for the target mainframe is located on the cloud object-based storage system, NO output of step 504, then the target mainframe computer makes a determination as to whether a predetermined amount of time has elapsed (step 506). If the target mainframe platform determines that the predetermined amount of time has not elapsed, NO output of step 506, then the process returns to step 506 where the target mainframe platform continues to wait for the predetermined amount of time to elapse. If the target mainframe platform determines that the predetermined amount of time has elapsed, YES output of step 506, then the process returns to step 502 where the target mainframe platform sends another inquiry to the cloud object-based storage system.

Returning again to step 504, if the target mainframe platform determines that a response to the inquiry was received indicating that a data file targeted for the target mainframe platform is located on the cloud object-based storage system, YES output of step 504, then the target mainframe platform sends a lock request to the cloud object-based storage system to lock a tracker file corresponding to the data file targeted for the target mainframe platform (step 508). In addition, the target mainframe platform generates a job control language statement to restore the tracker file, which corresponds to the data file targeted for the target mainframe platform, on the target mainframe platform from the cloud object-based storage system (step 510). The target mainframe platform attempts to restore the tracker file on the target mainframe platform using the job control language statement (step 512). The target mainframe platform makes a determination as to whether the restore of the tracker file on the target mainframe was successful (step 514).

If target mainframe platform determines that the restore of the tracker file on the target mainframe was not successful, NO output of step 514, then the target mainframe platform makes a determination as to whether the restore of the tracker file on the target mainframe failed a predetermined number of times, such as, for example, three times (step 516). If the target mainframe platform determines that the restore of the tracker file on the target mainframe did not fail the predetermined number of times, NO output of step 516, then the process returns to step 512 where the target mainframe platform continues to try to restore the tracker file on the target mainframe platform. If the target mainframe platform determines that the restore of the tracker file on the target mainframe did fail the predetermined number of times, YES output of step 516, then the process proceeds to step 530.

Returning again to step 514, if the target mainframe platform determines that the restore of the tracker file on the target mainframe was successful, YES output of step 514, then the target mainframe platform sends a lock request to the cloud object-based storage system to lock the data file (step 518). Further, the target mainframe platform generates another job control language statement to restore the data file on the target mainframe platform from the cloud object-based storage system based on information in the tracker file (step 520). Furthermore, the target mainframe platform attempts to restore the data file on the target mainframe platform using the other job control language statement (step 522).

The target mainframe platform makes a determination as to whether the restore of the data file on the target mainframe platform was successful (step 524). If the target mainframe platform determines that the restore of the data file on the target mainframe platform was successful, YES output of step 524, then the target mainframe platform sends an unlock and delete request to the cloud object-based storage system to unlock and delete the data file and the tracker file (step 526). Thereafter, the process terminates.

If the target mainframe platform determines that the restore of the data file on the target mainframe platform was not successful, NO output of step 524, then the target mainframe platform makes a determination as to whether the restore of the data file on the target mainframe failed the predetermined number of times (step 528). If the target mainframe platform determines that the restore of the data file on the target mainframe did not fail the predetermined number of times, NO output of step 528, then the process returns to step 522 where the target mainframe platform continues to try to restore the data file on the target mainframe platform. If the target mainframe platform determines that the restore of the data file on the target mainframe did fail the predetermined number of times, YES output of step 528, then the target mainframe platform logs a restore error (step 530). Thereafter, the process terminates.

Figure 6:
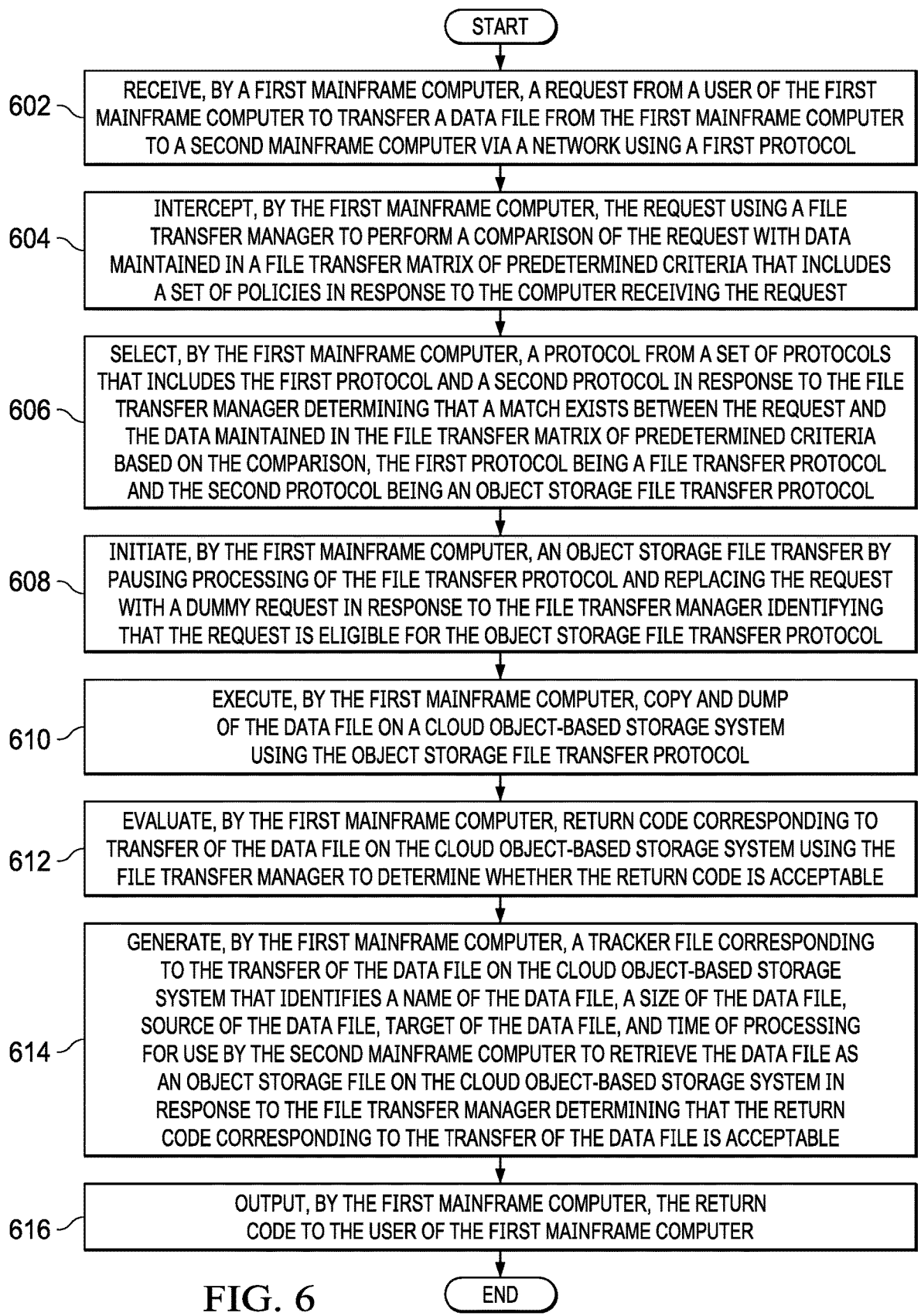
FIG. 6 is a flowchart illustrating a process for transferring a data file on a cloud object-based storage system in accordance with an illustrative embodiment.

With reference now to FIG. 6, a flowchart illustrating a process for transferring a data file on a cloud object-based storage system is shown in accordance with an illustrative embodiment. The process shown in FIG. 6 may be implemented in a first mainframe computer, such as, for example, mainframe platform 104 in FIG. 1, data processing system 200 in FIG. 2, or source mainframe platform 302 in FIG. 3.

The process begins when the first mainframe computer receives a request from a user of the first mainframe computer to transfer a data file from the first mainframe computer to a second mainframe computer via a network using a first protocol (step 602). In response to the first mainframe computer receiving the request, the first mainframe computer intercepts the request using a file transfer manager to perform a comparison of the request with data maintained in a file transfer matrix of predetermined criteria that includes a set of policies (step 604).

Afterward, in response to the file transfer manager determining that a match exists between the request and the data maintained in the file transfer matrix of predetermined criteria based on the comparison, the first mainframe computer selects a protocol from a set of protocols that includes the first protocol and a second protocol (step 606). The first protocol is a traditional file transfer protocol and the second protocol is an object storage file transfer protocol. In addition, in response to the file transfer manager identifying that the request is eligible for the object storage file transfer protocol, the first mainframe computer initiates an object storage file transfer by pausing processing of the traditional file transfer protocol and replacing the request with a dummy request (step 608). It should be noted that the first mainframe computer replaces the request with the dummy request only after all file dumps are completed successfully.

The first mainframe computer executes copy and dump of the data file on a cloud object-based storage system using the object storage file transfer protocol (step 610). Subsequently, the first mainframe computer evaluates return code corresponding to transfer of the data file on the cloud object-based storage system using the file transfer manager to determine whether the return code is acceptable (step 612).

In response to the file transfer manager determining that the return code corresponding to the transfer of the data file is acceptable, the first mainframe computer generates a tracker file corresponding to the transfer of the data file on the cloud object-based storage system that identifies a name of the data file, a size of the data file, source of the data file, target of the data file, and time of processing for use by the other computer to retrieve the data file as an object storage file on the cloud object-based storage system (step 614). Further, the first mainframe computer outputs the return code to the user of the first mainframe computer (step 616). Thereafter, the process terminates.

Thus, illustrative embodiments of the present invention provide a computer-implemented method, computer system, and computer program product for dynamically performing managed file transfer between different mainframe platforms based on a set of one or more policies. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing file transfers, the computer-implemented method comprising:

responsive to receiving a request from a user of a first mainframe to transfer a data file to a second mainframe using a file transfer protocol, intercepting the request using a file transfer manager to perform a comparison of the request with data maintained in a file transfer matrix of predetermined criteria that includes a set of policies;

responsive to determining that a match exists between the request and the data maintained in the file transfer matrix of predetermined criteria based on the comparison, identifying that the request is eligible for an object storage file transfer protocol;

initiating an object storage file transfer by pausing processing of the file transfer protocol;

executing copy and dump of the data file on a cloud object-based storage system using the object storage file transfer protocol; and replacing the request with a dummy request.

2. The computer-implemented method of claim 1 further comprising:

evaluating return code corresponding to transfer of the data file on the cloud object-based storage system using the file transfer manager to determine whether the return code is acceptable;

responsive to determining that the return code corresponding to the transfer of the data file is acceptable, generating a tracker file corresponding to the transfer of the data file on the cloud object-based storage system for use by the second mainframe to retrieve the data file as an object storage file on the cloud object-based storage system; and outputting the return code to the user of the first mainframe.

3. The computer-implemented method of claim 1 further comprising:
    collecting key performance indicators of the first mainframe, wherein the key performance indicators are selected from a group consisting of processor utilization, available memory, and network utilization;
    performing a comparison of the set of policies with the key performance indicators to determine whether the data file is eligible for the object storage file transfer protocol; and
    determining whether the data file is eligible for the object storage file transfer protocol based on the comparison.

4. The computer-implemented method of claim 3 further comprising:
    responsive to determining that the data file is not eligible for the object storage file transfer protocol based on the comparison, continuing to use the file transfer protocol to transfer the data file to the second mainframe.

5. The computer-implemented method of claim 3 further comprising:
    responsive to determining that the data file is eligible for the object storage file transfer protocol based on the comparison, retrieving the data file to be transferred to the second mainframe;
    pausing processing of the file transfer protocol to transfer the data file to the second mainframe;
    generating a job control language statement to copy and dump the data file on the cloud object-based storage system; and
    dumping the data file on the cloud object-based storage system using the object storage file transfer protocol based on the job control language statement.

6. The computer-implemented method of claim 5 further comprising:
    responsive to determining that the dump of the data file on the cloud object-based storage system was successful, generating a tracker file corresponding to transfer of the data file to the cloud object-based storage system;
    generating another job control language statement to copy and dump the tracker file on the cloud object-based storage system; and
    dumping the tracker file on the cloud object-based storage system using the object storage file transfer protocol based on the other job control language statement.

7. The computer-implemented method of claim 6 further comprising:
    responsive to determining that the dump of the tracker file on the cloud object-based storage system was successful, replacing the request to transfer the data file using the file transfer protocol with the dummy request, wherein the dummy request allows a successful file transfer return code to be sent to the user.

8. The computer-implemented method of claim 1 further comprising:
    sending an inquiry to the cloud object-based storage system regarding the transfer of the data file targeted for the second mainframe from the first mainframe;
    determining whether a response to the inquiry was received indicating that the data file targeted for the second mainframe is located on the cloud object-based storage system;
    responsive to determining that the response to the inquiry was received indicating that the data file targeted for the second mainframe is located on the cloud object-based storage system, generating another job control language statement to restore a tracker file that corresponds to the data file targeted for the second mainframe on the second mainframe from the cloud object-based storage system; and
    restoring the tracker file on the second mainframe using the other job control language statement.

9. The computer-implemented method of claim 1 further comprising:
    sending a lock request to the cloud object-based storage system to lock the data file;
    generating another job control language statement to restore the data file on the second mainframe from the cloud object-based storage system based on information in a tracker file;
    restoring the data file on the second mainframe using the other job control language statement; and
    sending an unlock and delete request to the cloud object-based storage system to unlock and delete the data file and the tracker file.

10. The computer-implemented method of claim 9, wherein the information in the tracker file includes data file identifier, data file size, job requester identifier, first computer identifier, second computer identifier, object storage identifier, and time of processing.

11. A computer system for managing file transfers, the computer system comprising:
    a bus system;
    a storage device connected to the bus system, wherein the storage device stores program instructions; and
    a processor connected to the bus system, wherein the processor executes the program instructions to:
        intercept a request using a file transfer manager to perform a comparison of the request with data maintained in a file transfer matrix of predetermined criteria that includes a set of policies in response to receiving the request from a user of a first mainframe to transfer a data file to a second mainframe using a file transfer protocol;
        identify that the request is eligible for an object storage file transfer protocol in response to determining that a match exists between the request and the data maintained in the file transfer matrix of predetermined criteria based on the comparison;
        initiate an object storage file transfer by pausing processing of the file transfer protocol;
    execute copy and dump of the data file on a cloud object-based storage system using the object storage file transfer protocol; and
    replace the request with a dummy request.

12. The computer system of claim 11, wherein the processor further executes the program instructions to:
    evaluate return code corresponding to transfer of the data file on the cloud object-based storage system using the file transfer manager to determine whether the return code is acceptable;
    generate a tracker file corresponding to the transfer of the data file on the cloud object-based storage system for use by the second mainframe to retrieve the data file as an object storage file on the cloud object-based storage system; and
    output the return code to the user of the first mainframe.

13. The computer system of claim 11, wherein the processor further executes the program instructions to:
    collect key performance indicators of the first mainframe, wherein the key performance indicators are selected from a group consisting of processor utilization, available memory, and network utilization;

perform a comparison of the set of policies with the key performance indicators to determine whether the data file is eligible for the object storage file transfer protocol; and determine whether the data file is eligible for the object storage file transfer protocol based on the comparison.

14. The computer system of claim 13, wherein the processor further executes the program instructions to:

continue to use the file transfer protocol to transfer the data file to the second mainframe in response to determining that the data file is not eligible for the object storage file transfer protocol based on the comparison.

15. The computer system of claim 13, wherein the processor further executes the program instructions to:

retrieve the data file to be transferred to the second mainframe in response to determining that the data file is eligible for the object storage file transfer protocol based on the comparison;

pause processing of the file transfer protocol to transfer the data file to the second mainframe;

generate a job control language statement to copy and dump the data file on the cloud object-based storage system; and dump the data file on the cloud object-based storage system using the object storage file transfer protocol based on the job control language statement.

16. A computer program product for managing file transfers, the computer program product comprising a computer readable storage medium having program instructions embodied therewith, the program instructions executable by a first mainframe to cause the first mainframe to perform a method comprising:

responsive to receiving a request from a user of the first mainframe to transfer a data file to a second mainframe using a file transfer protocol, intercepting the request using a file transfer manager to perform a comparison of the request with data maintained in a file transfer matrix of predetermined criteria that includes a set of policies;

responsive to determining that a match exists between the request and the data maintained in the file transfer matrix of predetermined criteria based on the comparison, identifying that the request is eligible for an object storage file transfer protocol;

initiating an object storage file transfer by pausing processing of the file transfer protocol;

executing copy and dump of the data file on a cloud object-based storage system using the object storage file transfer protocol; and replacing the request with a dummy request.

17. The computer program product of claim 16 further comprising:

evaluating return code corresponding to transfer of the data file on the cloud object-based storage system using the file transfer manager to determine whether the return code is acceptable;

responsive to determining that the return code corresponding to the transfer of the data file is acceptable, generating a tracker file corresponding to the transfer of the data file on the cloud object-based storage system for use by the second mainframe to retrieve the data file as an object storage file on the cloud object-based storage system; and outputting the return code to the user of the first mainframe.

18. The computer program product of claim 16 further comprising:

collecting key performance indicators of the first mainframe, wherein the key performance indicators are selected from a group consisting of processor utilization, available memory, and network utilization;

performing a comparison of the set of policies with the key performance indicators to determine whether the data file is eligible for the object storage file transfer protocol; and determining whether the data file is eligible for the object storage file transfer protocol based on the comparison.

19. The computer program product of claim 18 further comprising:

responsive to determining that the data file is not eligible for the object storage file transfer protocol based on the comparison, continuing to use the file transfer protocol to transfer the data file to the second mainframe.

20. The computer program product of claim 18 further comprising:

responsive to determining that the data file is eligible for the object storage file transfer protocol based on the comparison, retrieving the data file to be transferred to the second mainframe;

pausing processing of the file transfer protocol to transfer the data file to the second mainframe;

generating a job control language statement to copy and dump the data file on the cloud object-based storage system; and dumping the data file on the cloud object-based storage system using the object storage file transfer protocol based on the job control language statement.

* * * * *